W. RUNGE.
MICROMETER GAGE OR STOP DEVICE FOR LATHES.
APPLICATION FILED MAY 10, 1913.
1,127,525.
Patented Feb. 9, 1915.
2 SHEETS—SHEET 1.
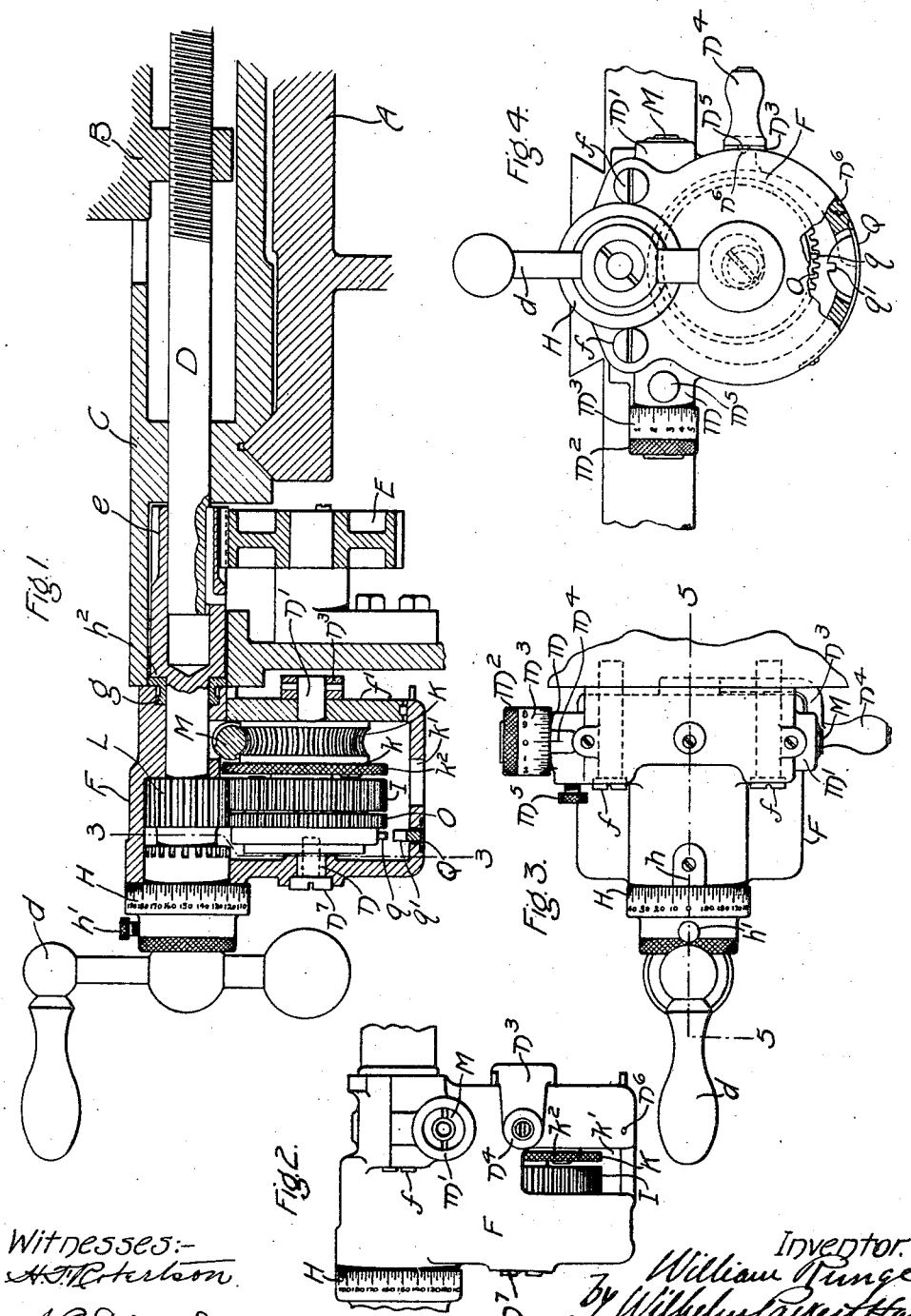
Witnesses:—
A. T. Peterson
A. G. Dimond
Inventor.
William Runge
by Wilhelm Parker Ward
Attorneys.

W. RUNGE.
MICROMETER GAGE OR STOP DEVICE FOR LATHES.
APPLICATION FILED MAY 10, 1913.
1,127,525.
Patented Feb. 9, 1915.
2 SHEETS—SHEET 2.
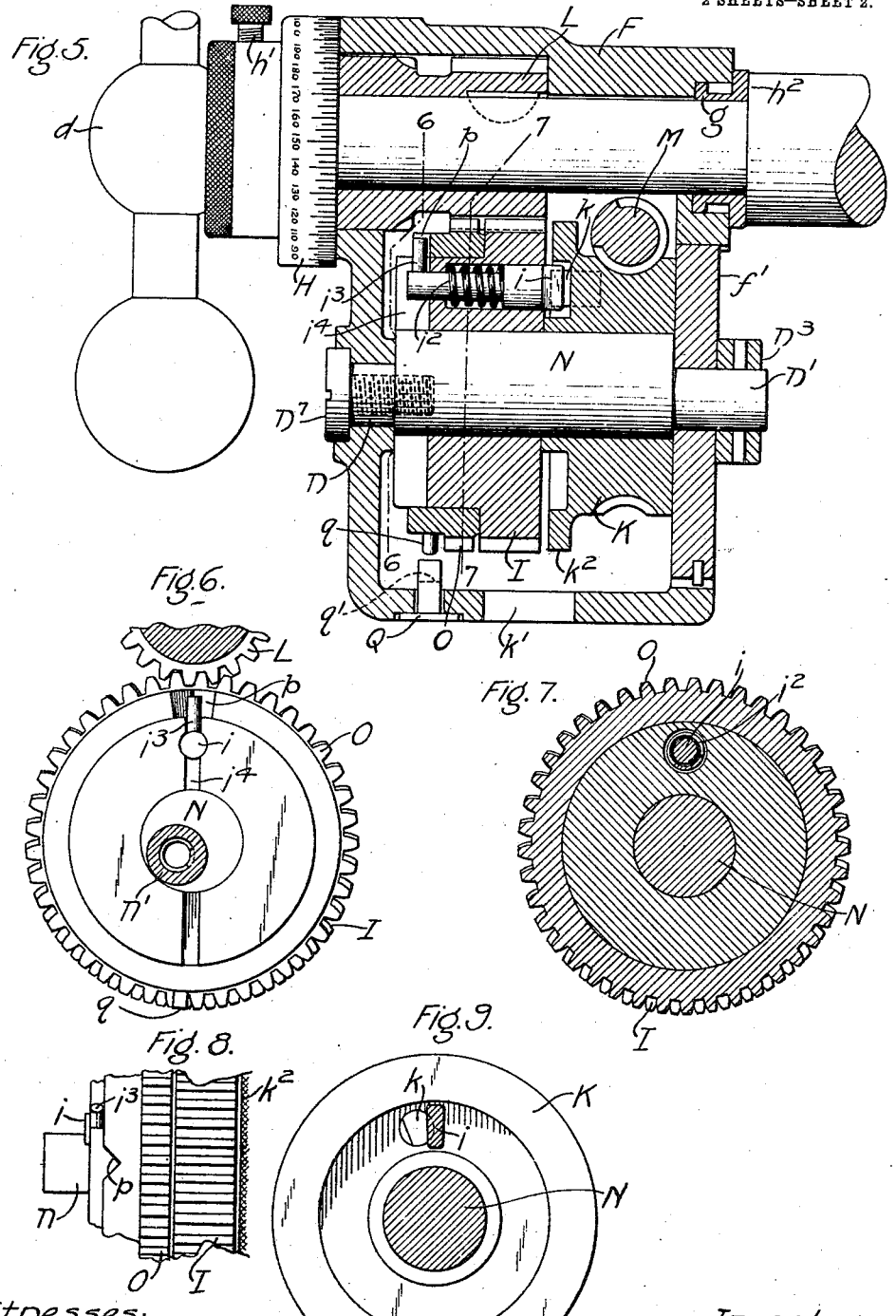

UNITED STATES PATENT OFFICE.

WILLIAM RUNGE, OF SENECA FALLS, NEW YORK, ASSIGNOR TO THE SENECA FALLS MFG. CO.

MICROMETER GAGE OR STOP DEVICE FOR LATHES.

1,127,525. Specification of Letters Patent. Patented Feb. 9, 1915.

Application filed May 10, 1913. Serial No. 766,736.

*To all whom it may concern:*

Be it known that I, WILLIAM RUNGE, a citizen of the United States, residing at Seneca Falls, in the county of Seneca and State of New York, have invented a new and useful Improvement in Micrometer Gages or Stop Devices for Lathes, of which the following is a specification.

This invention relates more particularly to improvements in micrometer gages or stop devices of the sort disclosed in Letters Patent No. 995,726, granted June 20, 1911, to myself, assignor to the Seneca Falls Mfg. Company, which are used on lathes and other machine tools for the purpose of gaging or determining with precision the advance movements of the cutter or tool toward the work, so as to enable the tool to be set to make cuts of any required depth and to enable the work to be reduced exactly to a predetermined dimension. In the said patented device the stop mechanism is arranged substantially concentrically with respect to the cross feed screw by which the cross slide of the carriage is moved to advance and retract the tool or cutter relatively to the work, and the gage or stop device projects more or less above the cross feed screw and top of the tool carriage.

One of the purposes of this invention is to produce an efficient and practical micrometer gage or stop device which is similar in principle of operation to said patented device and is adapted to accomplish similar results, but which is of a novel construction, such that the device does not project appreciably above the cross feed screw, or high enough to interfere with the compound tool rest on the carriage.

Other objects of the invention are to simplify the construction and reduce the cost of production of micrometer gages or stop devices of this nature, while at the same time producing a device which will be stronger and more durable and can be more readily operated for gaging or determining the movements of the tool or cutter.

In the accompanying drawings, consisting of two sheets: Figure 1 is a fragmentary cross sectional elevation of a lathe provided with a gage or stop device embodying the invention. Fig. 2 is a side elevation of the gage or stop device. Fig. 3 is a plan view thereof. Fig. 4 is an end elevation thereof, the casing being partly broken away to expose the latch device. Fig. 5 is a longitudinal sectional elevation thereof on an enlarged scale, on line 5—5, Fig. 3. Fig. 6 is a sectional elevation thereof in line 6—6, Fig. 5. Fig. 7 is a section of the stop carrier and stop shifting wheel in line 7—7, Fig. 5. Fig. 8 is a fragmentary plan view thereof showing the position of the parts when the traveling stop is retracted. Fig. 9 is a sectional elevation of the adjustable stop wheel and the coöperating stops.

Like reference characters refer to like parts in the several figures.

A, B and C, Fig. 1, represent, respectively, portions of the bed, tool-carriage and cross slide of a lathe; D the cross feed screw for moving the cross slide to advance and retract the tool or cutter carried thereby toward and from the work; and $d$ the crank or handle at the outer end of the feed screw for turning it. E, $e$ represent two gear wheels of the usual power driven gearing for operating the cross feed screw. The power driven gearing is thrown out of action when the feed screw is to be actuated by hand, and does not affect the operation of the gage or stop device which is used only when feeding by hand. These are all well known parts of an ordinary metal turning lathe and may be of the usual or any suitable construction. In so far as this invention is concerned the feed screw D could be employed for moving the tool carriage of machine tools of other kinds, or it can be considered as a movable element for any purpose, the movement of which it is desired to regulate or determine with accuracy by the gage or stop device about to be described.

F represents a hollow shell or casing which incloses and supports the movable parts of the gage or stop device. This casing is stationarily secured to the tool carriage in any suitable way, for instance by screws $f$, Figs. 3 and 4, and is preferably provided with a removable rear or inner end piece or plate $f'$. The feed screw D extends through the upper part of the casing F and is adapted to turn in a suitable bearing $g$ in the upper portion of the casing.

H represents a graduated part adapted to turn with the screw and coöperate with an index or mark $h$ on the stationary casing to indicate, in thousandths of an inch, or other desirable micrometer units of measure the adjustment of the cross slide by the turning of the screw. In the present device this part preferably consists of a collar surrounding the feed screw, between the crank or handle $d$ and the outer end of the casing. A set screw $h'$ or other suitable means is employed for adjustably securing the collar on the feed screw. By turning the collar on the feed screw, in any position of the latter, to place the zero mark of the collar in registration with the index mark $h$ on the casing and then securing the collar by the set screw $h'$, the graduations will indicate the rotary adjustment of the feed screw. The feed screw is held from endwise movement in the casing by the collar H and a shoulder $h^2$ on the feed screw at the inner end of the casing. The present device, like said patented device, involves a traveling stop which is caused to rotate by the turning of the feed screw, a rotatably adjustable stop which is adapted to coöperate with the traveling stop for arresting the feed screw in different desired positions, and means actuated by the feed screw for shifting one of these stops to cause it to engage and clear the other stop. These parts are, however, constructed and arranged differently in the present device, as will now be explained.

I and K represent, respectively, a stop carrier or wheel and a coöperating stop carrier or wheel which are arranged side by side below the feed screw so as to be rotatable about an axis parallel with the feed screw. The stop wheel I has gear teeth adapted to mesh with a gear pinion L secured to the feed screw whereby the stop wheel is caused to rotate when the feed screw is turned, and the other stop wheel K has worm teeth adapted to mesh with a worm or micrometer screw M by which this wheel K is normally held from rotation, but is adapted to be turned or rotatably adjusted to different positions by turning the worm. The stop wheels I and K are provided, respectively, with the coöperating traveling stop $i$ and the adjustable stop $k$ adapted to engage for limiting the rotation of the feed screw. If the stop wheel I is moved out of mesh with the pinion L on the feed screw and turned in one direction until arrested by the engagement of its stop $i$ with the coöperating stop $k$ and then again placed in mesh with the pinion L, it will be apparent that the feed screw can be turned in a direction to move the traveling stop $i$ away from the stop $k$, but the screw can be turned in the reverse direction only to the initial position or until the stop $i$ is again brought back into engagement with the stop $k$. When the stop wheel I is out of mesh with the pinion L it can be turned in either direction to cause the stop $i$ carried thereby to engage with either one or the other side of the coöperating stop $k$, thus enabling the feed screw to be turned in either one direction or the other from an initial position, in which the stops are in engagement and arrested by the engagement of the stops when returned to such initial position. The casing F is provided with an opening $k'$ in one side opposite the stop wheel I and a knurled edge $k^2$ of the worm wheel K, thus enabling these wheels to be readily turned by the fingers when they have been moved out of mesh with the pinion L and worm M.

The stop wheels I and K are arranged to rotate independently of each other on a shaft N below and parallel with the feed screw D, and for the purpose of enabling the stop wheel I to be moved into and out of mesh with the pinion L, this shaft N is provided at its ends with eccentric journals or pintles $n$ $n'$ which respectively enter bearings in the outer end and in the removable inner end plate $f'$ of the casing F. By partially rotating this shaft in one direction or the other the wheels I and K will be lifted into or lowered out of mesh with the pinion L and worm M. The stop wheels are held from endwise movement on the shaft N by the ends of the casing F.

As shown, the stop $i$ consists of a plunger arranged to slide in a pocket or recess in the stop wheel parallel with the axis thereof and is pressed toward the stop $k$ by a spring $i^2$ arranged between the inner end of the pocket and the shoulder on the stop $i$. The spring normally holds the stop in a projected position in which it is adapted to strike the coöperating stop $k$, but enables the stop to be retracted to a position in which it can pass by the stop $k$. The reduced end of the stop plunger projects beyond the outer side of the stop wheel and is provided with a pin $i^3$ which projects from the plunger in a slot $i^4$ in the outer side of the stop wheel I. This pin limits the movement of the stop by its spring and also prevents the stop from turning in its pocket. The stop $k$ consists of a fixed stud or projection which can be integral with or fixed to the wheel K in any convenient way.

The micrometer screw or worm M preferably extends transversely in the casing F between the feed screw D and the worm wheel K, being journaled and held from endwise movement in suitable bearings $m$ $m'$ at the opposite sides of the casing. A knurled knob or head $m^2$ is secured to one end of the worm or screw for turning it to adjust the worm wheel K and the stop $k$ carried thereby. This head is provided with scale graduations $m^3$ which coöperate with an index or mark $m^4$ in the adjacent bearing $m$ to indicate the adjustment of the stop by the worm. The large numbered divisions of the scale $m^3$ represent the same units of measure as the smallest divisions of the scale on the collar H, and the small divisions of the scale $m^3$ indicate fractions of these units of measure. $m^5$ is a set screw for securing the worm or screw M in any desired adjustment.

Any suitable means may be provided for turning the eccentric shaft N to move the wheels I and K into and out of mesh with the pinion L and worm M. As shown, the journal at the inner end of the shaft extends through the removable end plate $f'$ of the casing and is provided with an arm $n^3$ which at its outer end has a lateral extension projecting forwardly at the side of the casing F and provided with a handle $n^4$ in which is located a spring detent or plunger $n^5$ adapted to snap into notches or depressions $n^6$ in the wall of the casing F for holding the eccentric shaft either in a position in which the gear wheels I and K are in mesh with the pinion L and worm M, or in a position in which they are out of mesh and free from the pinion and worm.

The eccentric shaft N is retained in its bearings by a screw $n^7$ which is screwed into the outer journal of the shaft and has an enlarged head entering a recess in the outer end of the casing. By removing this screw after the casing F has been detached from the lathe carriage the eccentric shaft and the end plate $f'$ can be withdrawn rearwardly from the casing, after which the gear wheels I and K can be readily removed through the open inner end of the casing. The eccentric shaft could be mounted in the casing in any other suitable way and any other suitable means employed for rocking it and holding it in its different positions.

O represents a gear wheel or ring for retracting the traveling stop $i$ so as to clear the stop $k$. This wheel O, as shown, is journaled on a reduced portion of the stop wheel I and is provided with teeth adapted to mesh with the pinion L. Both of the wheels I and O are adapted to be turned simultaneously by the pinion L, but one of the wheels has a greater number of teeth than the other, for instance, the stop wheel I has one tooth more than the retracting wheel O, so that when the wheels are rotated by turning the feed screw and the pinion L the stop wheel will be retarded somewhat with respect to the wheel O. The retracting wheel has a V-shaped notch $p$ in its end into which the pin $i^3$ on the stop plunger extends when the stop $i$ is projected in position to engage the stop $k$. When the stop wheel I has been turned nearly one revolution by the rotation of the feed screw in one direction the relative movement between the wheels I and O will cause the pin $i^3$ to ride up one of the inclined sides of the notch $p$ onto the outer end of the wheel O, thereby retracting the stop $i$ to a position in which it can pass by the stop $k$. When the feed screw is turned in the return or opposite direction and causes an opposite rotation of the wheels I and O, these wheels will be moved differentially, thus bringing the notch of the wheel O again into registration with the pin $i^3$ and permitting the stop $i$ to be again projected by its spring in a position to strike the stop $k$ and prevent the return movement beyond the initial position of the stop wheel and of the feed screw.

Q represents a spring catch secured to the lower part of the casing F opposite to a pin or projection $q$ on the retracting wheel O. The catch has a notch $q'$ adapted to receive the pin $q$ and has inclined edges at opposite sides of this notch on which the pin is adapted to ride into the notch. When the stop wheels I and K and retracting wheel O have been lowered out of mesh with the pinion L and worm M the wheel I can be turned by hand in either direction until the catch springs into engagement with the pin and holds the wheel from further rotation.

When it is desired to use the gage or stop device for arresting the inward movement of the cross slide the eccentric shaft is turned by means of the handle $n^4$ to lower the wheels I, O and K out of mesh with the pinion L and worm M. The stop wheel I is then turned by hand in a clock-wise direction until arrested by the engagement of the pin $q$ with the catch Q. The worm wheel K is then turned by hand in the same direction until arrested by the engagement of its stop $k$ with the stop $i$. In this position of the wheels the teeth of the stop wheel I and the retracting wheel O will be substantially in alinement at the upper portions of the wheels, so as to readily mesh with the pinion L. The eccentric shaft N is then turned by the handle $n^4$ to again place the wheels I and O in mesh with the pinion L and the worm wheel K in mesh with the worm or screw M. The worm wheel K will now be held from rotation by the worm or screw M and the engagement of the stops $i$ and $k$ will prevent the feed screw from being turned to the right, that is in a direction to feed the cross slide and tool inwardly to the work, but the crank can be turned to the left or in a direction to retract the tool from the work. When the feed screw has been turned in the retracting direction sufficiently to cause nearly a complete revolution of the stop wheel I, the traveling stop $i$ will be retracted by the retracting wheel O so as to pass by the stop $k$, as before explained, and, therefore, the rotation of the feed screw in this direction can be continued. The relative movement between the stop wheel I and the retracting wheel O is so small for each revolution of these wheels that the feed screw can be turned to the left a sufficient number of revolutions to back the tool away from the work as far as is ordinarily required in a lathe. The feed screw can, however, only be turned to the right until the tool is moved inwardly to the position it occupied when the stops $i$ and $k$ were in engagement. The tool can be advanced from this position in thousandths of an inch or other micrometer distances, represented by the graduations on the micrometer screw or worm M, by turning this screw which turns the worm wheel K and retracts the stop $k$ from the stop $i$, thereby allowing the feed screw to be turned to the right until arrested by the stop $i$ striking the stop $k$. Thus the tool can be advanced short distances to make successive cuts of any predetermined depth by successive appropriate adjustments of the micrometer screw M.

When it is desired to limit the outward movement of the cross slide and tool, as for instance when using an internal tool or cutter, the stop and retracting wheels are moved out of mesh with the pinion L and worm or screw M, as before, and the stop wheel I is turned to the left until the stop wheel is arrested by the engagement of the pin $q$ with the catch Q. The worm wheel K is then turned to the left until it is stopped by the engagement of its stop $k$ with the stop $i$, after which the stop wheels are again placed in mesh with the pinion L and the worm or screw M. The feed screw can not then be turned to the left beyond this position to feed the tool outwardly, but it can be turned to the right as many times as necessary to back the tool inwardly to the required position away from the work. The micrometer screw or worm M can also be used in the same manner as before to permit successive outward advance movements of the tool, except that the worm or screw is turned in the opposite direction.

When the stop wheels are moved out of mesh with the pinion L and worm or screw M the feed screw is left free and can be turned in either direction without restriction, either by hand or by the power driven feed gearing of the lathe.

By constructing the device as above described, the parts are few in number, and are of simple and strong construction. The adjustable stop $k$ is fixed directly to the worm wheel K, of which it could be an integral part, and the other stop $i$ is both driven or caused to travel when the feed screw is turned and is shifted to engage and clear the adjustable stop $k$. As the stop wheels, retracting wheel and micrometer screw or worm are all located below the feed screw, there is no part of the device which projects to any considerable extent above the feed screw.

I claim as my invention:

1. The combination of a rotatable element, a stop carrier which is adapted to be moved by said element, a traveling stop on said carrier, a coöperating adjustable stop which is adapted to be engaged by said traveling stop to limit the rotation of said element in one direction, and means actuated by the rotation of said element in the opposite direction for shifting said traveling stop on its carrier to clear said adjustable stop, substantially as set forth.

2. The combination of a rotatable element, a stop carrier which is adapted to be moved by said element, a traveling stop on said carrier, a coöperating adjustable stop which is adapted to be engaged by said traveling stop to limit the rotation of said element in one direction, means actuated by the rotation of said element in the opposite direction for shifting said traveling stop on its carrier to clear said adjustable stop, and means for moving said adjustable stop to and holding it in different stop positions, substantially as set forth.

3. The combination of a movable element, a rotatable stop carrier adapted to be revolved by the movement of said element, a traveling stop on said carrier, a coöperating adjustable stop which is adapted to be engaged by said traveling stop to limit the movement of said element in one direction, and means actuated by the movement of said element in the opposite direction for shifting said traveling stop on its carrier to clear said adjustable stop, substantially as set forth.

4. The combination of a movable element, a rotatable stop carrier adapted to be revolved by the movement of said element, a traveling stop on said carrier, a stop which is rotatably adjustable relative to said stop carrier and is adapted to be engaged by said traveling stop to limit the movement of said element in one direction, and means actuated by the movement of said element in the opposite direction for shifting said traveling stop on its carrier to clear said adjustable stop, substantially as set forth.

5. The combination of a movable element, a rotatable stop carrier adapted to be revolved by the movement of said element, a traveling stop on said carrier, a coöperating adjustable stop which is adapted to be engaged by said traveling stop to limit the movement of said element in one direction, and a rotary member which is revolved differentially relative to said stop carrier by said movable element for shifting said traveling stop to engage or clear said adjustable stop, substantially as set forth.

6. The combination of a movable element, a rotatable stop carrier adapted to be revolved by the movement of said element, a traveling stop on said rotatable carrier, a rotatably adjustable wheel adjacent to said stop carrier provided with a stop adapted to be engaged by said traveling stop to limit the movement of said element in one direction, means for holding said wheel from rotation by said element, and means for shifting said traveling stop relative to its carrier to clear said coöperating stop when said element is moved in the opposite direction, substantially as set forth.

7. The combination of a movable element, and stop mechanism for determining the movement of said element in one direction comprising a traveling stop which is adapted to move with said element, a coöperating stop which is adjustable for arresting the movement of said element in different positions, and means driven differentially relative to said traveling stop for shifting said traveling stop to adopt it to pass by said coöperating stop when said element is moved in the opposite direction, substantially as set forth.

8. The combination of a rotatable element, and stop mechanism for said element comprising a traveling stop which is adapted to move with said element, a coöperating stop which is adjustable for arresting the rotation in one direction of said element at different positions, and driven means for shifting one of said stops to adapt it to pass by said other stop when said element is rotated in the opposite direction, said stop mechanism being located at one side of said rotatable element, substantially as set forth.

9. The combination of a rotatable element, and stop mechanism for said element comprising a traveling stop which is adapted to move with said element, a coöperating stop which is adjustable for arresting the rotation in one direction of said element at different positions, said traveling and adjustable stops being movable together into and out of operative connection with said element to permit the stop mechanism to be set for a desired adjustment of said element, substantially as set forth.

10. The combination of a rotatable element, and stop mechanism for said element comprising a traveling stop which is adapted to move with said element, a coöperating stop which is adjustable for arresting the rotation in one direction of said element at different positions, said traveling and adjustable stops being movable toward and from said element into and out of operative connection therewith to permit the stop mechanism to be set for a desired adjustment of said element, substantially as set forth.

11. The combination of a rotatable element, a traveling stop which is adapted to be rotated by said element, a coöperating rotatably adjustable stop which is adapted to be engaged by said traveling stop to limit the rotation of said element, and means actuated by the rotation of said element in one direction for shifting one of said stops to a position to clear the other stop, said stops being arranged to rotate about an axis parallel with but eccentric to said element, substantially as set forth.

12. The combination of a rotatable element, a traveling stop which is adapted to be rotated by said element, a coöperating rotatably adjustable stop which is adapted to be engaged by said traveling stop to limit the rotation of said element, a wheel which is rotated by said element for shifting one of said stops into and out of position adapting it to engage the other stop, said stops and said wheel being arranged to rotate about an axis parallel with but eccentric to said element, substantially as set forth.

13. The combination of a rotatable element, a traveling stop which is adapted to be rotated by said element, a coöperating rotatably adjustable stop which is adapted to be engaged by said traveling stop to limit the rotation of said element, and a shaft parallel with said element on which said stops are rotatably supported, said shaft being movable to place said stops into and out of operative connection with said rotatable element, substantially as set forth.

14. The combination of a rotatable element, a gear pinion thereon, a stop wheel arranged to mesh with said pinion and provided with a traveling stop, an adjustable stop wheel provided with a coöperating stop adapted to be engaged by said traveling stop for limiting the movement of said element, means for adjusting and holding said adjustable stop wheel, said stop wheels being journaled side by side eccentrically to said rotatable element, and means for shifting said traveling stop into and out of position to engage said other stop, substantially as set forth.

15. The combination of a rotatable element, a gear pinion thereon, a stop wheel arranged to mesh with said pinion and provided with a traveling stop, an adjustable stop wheel provided with a coöperating stop adapted to be engaged by said traveling stop for limiting the movement of said element, means for adjusting and holding said adjustable stop wheel, said stop wheels being journaled side by side eccentrically to said rotatable element, and a wheel which is also driven by said pinion and is moved relatively to said first mentioned stop wheel for retracting said traveling stop to clear said other stop when said stop wheel is turned substantially a full revolution in one direction, substantially as set forth.

16. The combination of a rotatable element, a gear pinion thereon, a stop wheel arranged to mesh with said pinion and provided with a traveling stop, an adjustable stop wheel provided with a coöperating stop adapted to be engaged by said traveling stop for limiting the movement of said element, means for adjusting and holding said adjustable stop wheel, said stop wheels being journaled side by side eccentrically to said rotatable element, a wheel which is also driven by said pinion and is moved relatively to said first mentioned stop wheel for retracting said traveling stop to clear said other stop when said stop wheel is turned substantially a full revolution in one direction, said stop and retracting wheels being movable to place them into and out of mesh with said pinion, and a catch for engaging and holding said wheels when out of mesh with said pinion, substantially as set forth.

17. The combination of a movable element, a rotatable stop carrier which is adapted to be revolved by the movement of said element but is held from axial movement, a traveling stop on said carrier, a coöperating adjustable stop which is adapted to be engaged by said traveling stop to limit the movement of said element in one direction, and means actuated by the movement of said element in the opposite direction for shifting said traveling stop axially on its carrier to clear said adjustable stop.

Witness my hand, this 6th day of May, 1913.

WILLIAM RUNGE.

Witnesses:
P. B. KENDIG,
J. C. DAVIS.